Patented Oct. 4, 1932

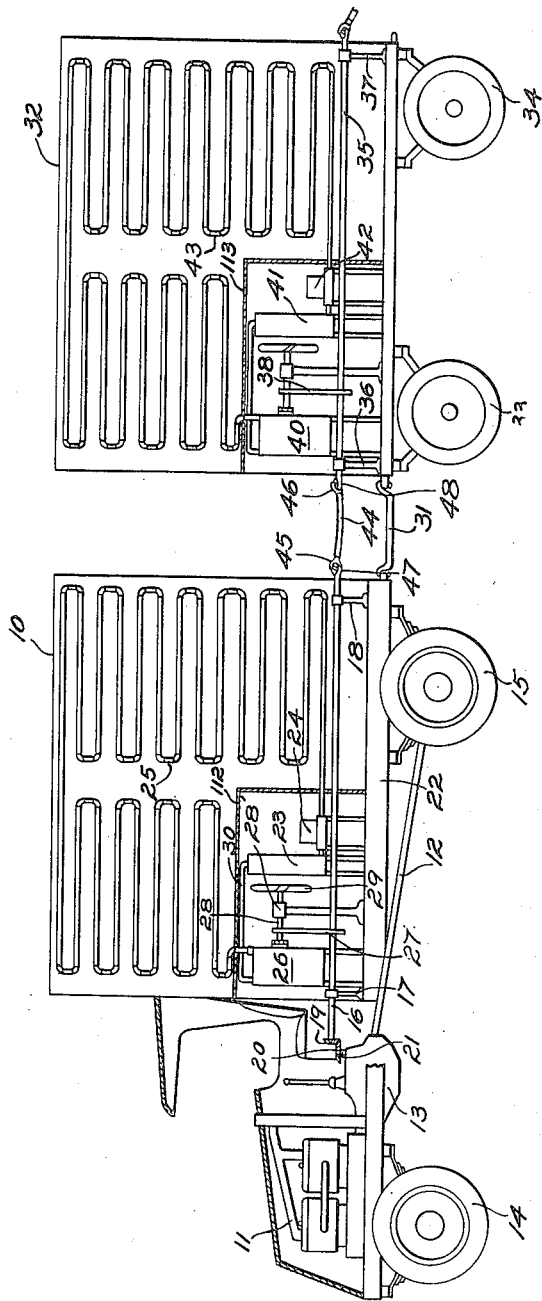

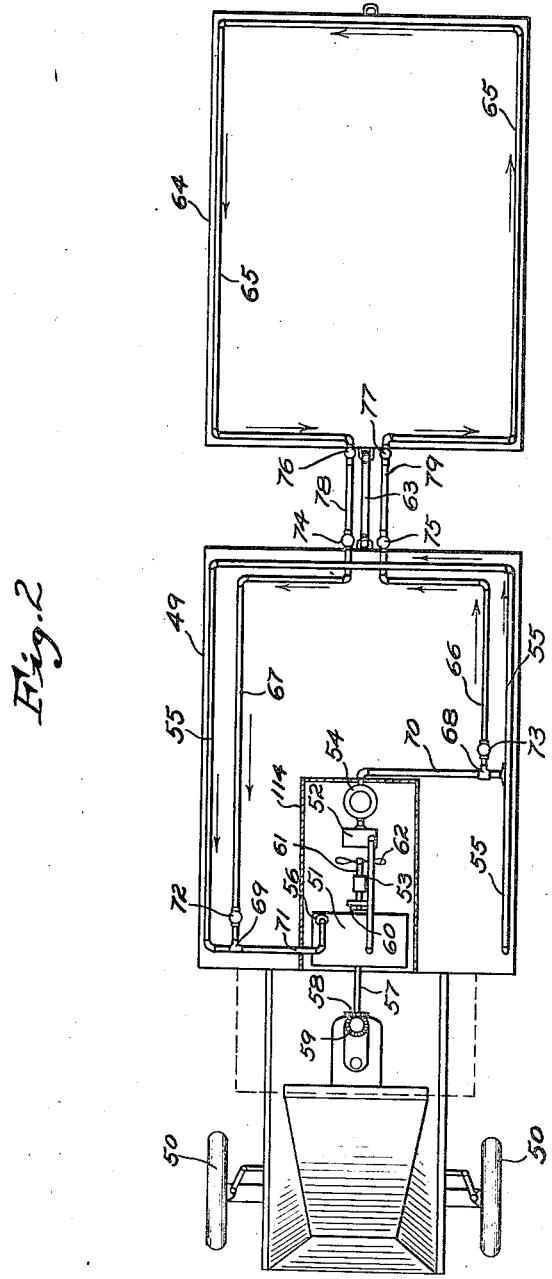

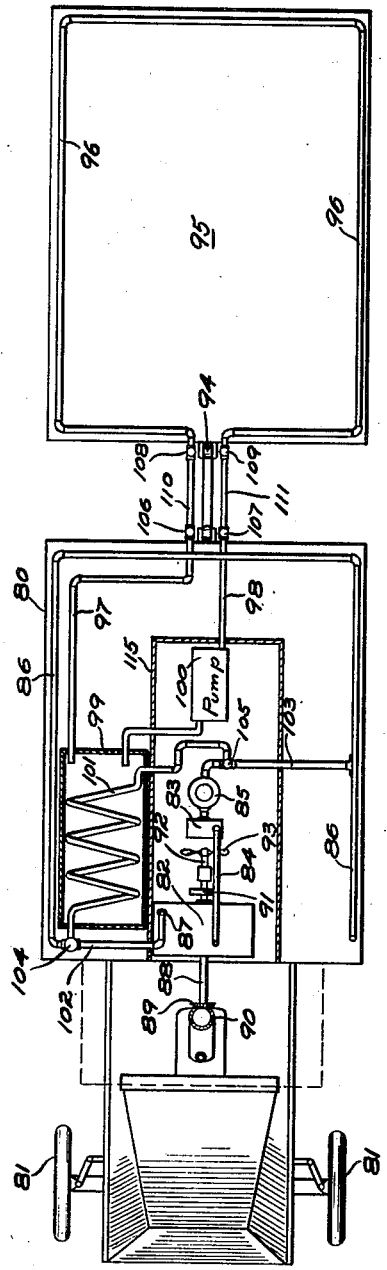

1,880,245

UNITED STATES PATENT OFFICE

WILFRED FOURNESS, OF OAKLAND, AND EDWARD G. BURGHARD, OF LOS ANGELES, CALIFORNIA, ASSIGNORS TO FOURNESS DEVELOPMENT CORPORATION LTD., OF NEW YORK, N. Y., A CORPORATION OF NEW YORK

REFRIGERATOR VEHICLE AND TRAILER

Application filed November 7, 1930. Serial No. 494,048.

This invention relates to a portable refrigerating system for conveying food products or other perishable articles, and more particularly relates to a novel means for increasing the size of the refrigerated compartments and refrigerating system at will. Portable vehicles having a refrigerating body adapted to handle food products and the like and which is provided with a refrigerating apparatus adapted to be driven by a motor which also acts to propel the vehicle is now known in the art as is evidenced by the United States Letters Patent to Hatch 1,341,744, issued on June 1, 1920. However, in such a portable refrigerating system there is no way to adjust the capacity of the compartment dependent on the amount of food products or other perishable articles to be carried from place to place. In the refrigerating vehicles of the prior art, the body was divided into a plurality of cooling compartments which were carried about from place to place regardless of the amount of food products in these compartments.

Thus, as is often the case with a small shipment, but one compartment may be filled with food products, yet due to the design of this refrigerating system, it is necessary to convey the empty cooling compartments about. It is readily apparent that this greatly adds to the cost of transportation and refrigeration of these articles, which is an important factor in regulating the price of food products.

It is an object of this invention to improve the refrigerator vehicle systems of the prior art by providing a means for adding any desired number of refrigerator compartments or trailers to the main refrigerator vehicle which may be readily determined by the quantity or bulk of food products or frozen confections, such as ice cream, which are to be transported.

It is a further object of this invention to provide a means for limiting the number of refrigerating units or trailers at will.

It is a further object of this invention to provide a refrigerating vehicle to which any desired number of refrigerating trailers may be added; each of these refrigerating trailers being provided with an independent compressor system which is operated in conjunction with and from the same source as the compressor system in the motor vehicle, by means of a simple mechanical driving connecting means.

It is a further object of this invention to provide a refrigerator vehicle to which any number of refrigerator trailers may be added and which are mechanically refrigerated by a single compressor mechanism in the main body of the refrigerator vehicle. A novel valve arrangement is employed in this system, which enables the operator to cut off the supply of refrigerant from the main body to the trailers, in case it is desired to utilize the vehicle without the addition of any refrigerating trailers.

It is frequently undesirable to employ a gaseous refrigerant in more than one refrigerating compartment, for in case of shutdown, the gas, in the lines connecting these compartments, condenses and produces a deleterious effect on the refrigerating system. It is, therefore, a further object of this invention to provide a means for utilizing a gaseous refrigerant in the main vehicle body of the refrigerating system and by means of suitable connection, cooling a liquid refrigerant and utilizing it in the additional trailers or cooling compartments which may be added to the main body.

Our invention possesses many other advantages, and has other objects which may be made more easily apparent from a consideration of several embodiments of my invention. For this purpose we have shown a few forms in the drawings accompanying and forming part of the present specification. We shall now proceed to describe these forms in detail, which illustrate the general principles of our invention; but it is to be understood that this detailed description is not to be taken in a limiting sense, since the scope of our invention is best defined by the appended claims.

Referring to the drawings:

Figure 1 is a side elevation, mainly diagrammatic, of a refrigerator truck and trailer embodying this invention, the body portion of which is shown in vertical section for the purpose of illustration;

Fig. 2 is a top plan view, mainly diagrammatic, of a modified form of the invention shown in Fig. 1, shown in this instance with the roof or top removed for the purposes of illustration; and Fig. 3 is a top plan view, mainly diagrammatic, of another modification embodying this invention.

The main vehicle body which is indicated by the numeral 10, is mounted upon a chassis of the usual type, and is supported above the ground by the wheels 14, 15. The vehicle body is driven by a motor 11 through the medium of a driving or propeller shaft 12 connected in a suitable manner to the transmission 13 and the rear axle to which the wheels 15 are secured.

The main vehicle body 10 forms the storage space for the food products and other perishables and in addition houses a mechanical refrigerating system which is operated by a rotatable shaft 16 mounted in bearings 17, 18. Any suitable power transmission can be provided to operate the refrigerating system from engine 11. Thus, to the forward end of the shaft 16 a beveled gear 19 is integrally secured, and is adapted to mesh with a correspondingly beveled pinion 20. A shaft 21, to which the pinion is secured, extends into the transmission 13 and is rotated by a suitable mechanical driving means therein. This acts to rotate the pinion which in turn rotates the shaft 16.

The refrigerating system is diagrammatically shown, and it consists of a complete circulatory system for a refrigerant that is cyclically permitted to expand, next compressed, and finally condensed. The moving parts of this system are mounted on a base 22 which also serves as the floor of the main body 10. Thus a condenser 23, in the bottom of which the condensed refrigerant settles, leads to an expansion valve 24 which intermittently operates in response to variations in pressure therein to permit the flow of the refrigerant into the expansion coils 25. These coils are arranged along the side and end walls of the main body 10, and due to the rapid vaporization and expansion of the refrigerant therein, act to absorb the heat within the main body. The vaporized refrigerant then passes into the inlet of a compressor 26. The compressor may be of any desired type, and in this instance it is shown as mounted on the base 22 and driven by an endless sprocket chain 27 which surrounds a sprocket wheel keyed to the shaft 16 and a sprocket wheel keyed to a rotatable shaft 28 which extends into the compressor. This shaft is mounted for rotation in a bearing 28', and is provided with a fan 29 at its free end which acts to assist the movement of cool air over the condenser 23, and thereby aids in the condensation of the refrigerant therein.

The compressor 26 acts on the refrigerant to compress it and in this state it is forced out of the outlet through the conduit 30 and finally into the condenser 23. Here, the refrigerant is liquefied and the process above outlined is repeated.

Although the showing of the main body 10 is diagrammatic, it is to be understood that the walls thereof are constructed in such a manner as to aid in the insulation of the interior or storage space. Thus, the walls may be formed of cork or of spaced boards filled with a suitable insulating material such as granulated cork, cotton, bagasse, etc.

If it is desired to transport food products of an amount greater than the interior of the main body 10 can hold, a portable trailer may be secured to the main body in any desirable manner as by a tie rod 31. This trailer comprises a main body 32, similar in all respects to the main body 10, and is mounted on the wheels 33, and 34. The main body 32 houses a refrigerating system, similar to the refrigerating system heretofore described, which is operated by a rotatable shaft 35, mounted in the bearings 36, 37, and an endless sprocket chain 38. It comprises a compressor 40, a condenser 41, an expansion valve 42, and an expansion coil 43. The rotation of the shaft 35 is effectuated by a simple mechanical connection between the rotating shaft 16 and the rotatable shaft 35. Thus a flexible link 44 is provided with swivel knuckles 45, 46 which coact with corresponding swivel knuckles 47, 48 at the ends of the shafts 16 and 35 respectively, to form universal joints. It is now readily apparent that a rotation of the shaft 16 causes a corresponding rotation of the shaft 35 which in turn acts to operate the compressor in a manner heretofore described.

If it is desired to further increase the quantity of food products to be transported, it is readily apparent that additional trailers similar to that heretofore described, may be connected to trailer 32, and operated as before, and hauled by the motor 11. By means of this novel arrangement, a means is provided for readily increasing or decreasing the amount of refrigerating space to be hauled, which is dependent upon the quantity of food products or other perishable articles to be transported.

In Fig. 2 there is shown a modification of the invention shown in Fig. 1, as in this instance we employ a central refrigerating system in the main body of the refrigerator truck which supplies refrigerant to the trailers to be secured to the truck. As before, the truck comprises a chassis supporting a main body 49, which is mounted on the front wheels 50 and the back wheels (not shown). The side and end walls of this main body are formed of a suitable heat insulating structure, such as cork or spaced boards filled with cork, cotton, etc.

The refrigerating system employed herein is in all respects similar to that disclosed in Fig. 1, but in this instance, it is somewhat larger as but one refrigerating system is employed to cool the truck and the trailer or trailers secured thereto. It comprises a compressor 51 the outlet of which is connected to a condenser 52, as by a conduit 53. From the condenser, the condensed refrigerant is forced to an expansion valve 54 and then into the expansion coils 55 where the refrigerant vaporizes and absorbs the heat about the coils. The vaporized gas then enters the inlet 56 of the compressor, where it is compressed and forced into the condenser and from there follows the same procedure above outlined.

The compressor 51 can be operated in the same manner as compressor 26. Thus a rotatable shaft 57 has a beveled gear 58 at one end thereof which meshes with a rotating pinion 59 from the transmission. A sprocket chain 60, surrounding sprocket wheels keyed to the shaft 57 and a shaft 61, acts to rotate the shaft 61 which in turn operates the compressor. A fan 62 is secured to the free end of the shaft 61 in order to direct a current of air over the condenser and thus aid in the condensation of the vaporized refrigerant therein.

If the use of an additional trailer is required in this system, it may be readily secured to the truck as by a tie rod 63. This trailer comprises a main body 64, the walls of which are similar to the walls of the main body 49. Refrigerant is applied to this trailer by means of coils 65, about the sides and ends of the trailer, which are connected to conduits 66, 67, in body 49. These conduits are tapped into the expansion coils 55 in any desirable manner as by T connections 68, 69. It will be noted that the conduits 66, 67 are tapped into the coils 55 at points along the outgoing conduit 70, and the incoming conduit 71. It is now apparent that the refrigerant from the expansion valve 54 will flow through the conduit 70 and into the conduit 66 and coil 55. The refrigerant will then flow through the coils 55 and 65 in the direction of the arrows, into the inlet conduit 71 and finally into the compressor 51.

If the refrigerating truck is to be used alone, the trailer can be readily disconnected, and this should preferably be done without losing the refrigerant in the coils 65 and the conduits 66, 67. This is readily accomplished by means of the valves 72, 73, 74, 75, 76, 77 arranged in and at the extremities of the conduits and coils. Thus, if it is desired to disconnect the trailer, the valves 72–77, which are normally maintained open, are closed and the refrigerant within the coils 65 and the conduits 66, 67 is trapped therein. It is now merely necessary to remove the tie rod 63 and the connecting conduits 78, 79, which are preferably armored or otherwise protected, and form the connecting links between the two vehicles 49 and 64. Of course, the compressor still operates to pump refrigerant through the coils 55.

To add a trailer or trailers to the refrigerating truck, it is simply necessary to insert the tie rod 63 and the connecting conduit 78, 79, and to open the valves 72–77 and the compressor will then operate as hereinabove set out to pump the refrigerant through both the truck body and trailer body.

It may, not infrequently, be desirable to keep the trailer shown in Fig. 2 inactive for a long period of time and accordingly, the refrigerant therein will condense in the coils 65 and may not provide fully efficient performance for a short interval when connected to the refrigerator truck. I have found that by the use of a circulatory brine system for the trailer, the trailer may be kept inactive for indefinite periods without deleteriously affecting the coils or the efficiency of the system when connected to the refrigerator truck. This form of the invention is clearly set forth in diagrammatic form in Fig. 3.

Again as in Fig. 1, the truck comprises a chassis supporting a main body 80 which is mounted on the front wheels 81 and the back wheels (not shown). The side and end walls of this body are formed of the same or equivalent materials as the side and end walls of the bodies 10 and 49. The refrigerating system employed herein is similar to that previously disclosed in connection with Fig. 2.

It comprises a compressor 82, the outlet of which is connected to a condenser 83, as by a conduit 84. From the condenser, the condensed refrigerant is forced to an expansion valve 85 and then into the expansion coils 86 where the refrigerant vaporizes and absorbs the heat about the coils. The vaporized refrigerant then enters the inlet 87 of the compressor, where it is compressed and forced into the condenser and from there follows the same path already outlined.

The compressor is operated by a rotatable shaft 88 which has a beveled gear 89 at one end thereof. This gear is arranged to mesh with a rotating pinion 90 which is rotated in any desirable manner as by suitable mechanical connections with the transmission. A sprocket chain 91, surrounding sprocket wheels which are keyed to shaft 88 and a shaft 92, acts to rotate shaft 91 which in turn operates the compressor. A fan 93 is secured to the free end of the shaft 92 to rotate therewith and thereby cause a current of air to be passed through and about the condenser.

When the use of an additional trailer is required, it may be readily secured to the refrigerator truck as by a tie rod 94. The trailer, referred to as by 95, is in all respects similar to the trailer shown in Fig. 2, but in this instance the coils 96 are designed to have cooled brine circulate therethrough. Brine is circulated through the coils 96 through the medium of conduits 97, 98 leading to and from a hermetically sealed brine tank 99 and a pump 100. The brine within the tank 99 is cooled as by the coil 101 which is tapped into the incoming conduit 102, and the outgoing conduit 103 of the expansion coil 86, and which passes through the brine tank.

The operation of the system is now readily apparent. The refrigerant from the expansion valve 85 passes through the conduit 103, into and about the expansion coil 86 and finally into the compressor by way of the conduit 102. This causes the interior of the main body 80 to be cooled to the desired temperature. In addition, the refrigerant simultaneously passes through the coil 101 and acts to cool the brine which in turn is circulated from the tank 99 through the conduit 98, the coil 96 and the conduit 97 by means of the pump 100. In this manner the cooling of the interior of the trailer 95 is achieved.

The trailer can be readily disconnected from the refrigerator truck, and the brine within the coils and conduits maintained therein, by means of the valves 104, 105, 106, 107, 108, and 109. Thus by closing the valves 104–109, the circulatory brine system is interrupted and the brine is maintained intact in the coil 96, the tank 99 and conduits 97, 98. The tie rod 94 and the connecting conduits 110 and 111 are then removed, and the trailer stored until such time as needed.

The valves 104 and 105 are two-way valves, which when closed to prevent the circulation of the refrigerant through the coil 101, nevertheless permit the operation of the circulatory refrigerating system within the main body 80.

Although not essential, it is quite advantageous to box off or separate the compressor mechanism from the refrigerating compartment. This may be readily accomplished by means of a box or compartment 112, 113, 114, 115 fully enclosing the compressor shown in Figs. 1–3, respectively. In this manner, a means is provided for maintaining any heat generated by the compressor mechanism away from the refrigerating compartment, and any edibles in the refrigerating compartment away from the compressor.

We claim:

1. In combination with a motor driven vehicle, a circulatory refrigerating system within the body of the vehicle operated by said motor, and one or more refrigerated vehicle bodies secured thereto.

2. In combination with a motor driven vehicle, a circulatory refrigerating system within the body thereof operated by said motor, and one or more vehicle bodies secured thereto, each of said bodies having circulatory refrigerating systems therein.

3. In combination with a motor driven vehicle, a circulatory refrigerating system within the body thereof operated by said motor, and one or more vehicle bodies secured thereto, each of said bodies having an independent circulatory refrigerating system therein; and means to operate the refrigerating systems in the bodies.

4. In combination with a motor driven vehicle, one or more trailers, a circulatory refrigerating system in the body of the vehicle and in each of the trailers, said motor serving to operate said first named refrigerating system, and means to operate the refrigerating systems in the trailers, said second named means being operated by and in conjunction with the motor.

5. In combination with a motor driven vehicle, a circulatory refrigerating system within the body thereof operated by said motor, and one or more trailers secured thereto, each of said trailers having a circulatory refrigerating system therein, and means whereby the trailers may be readily disconnected from the vehicle body without interrupting or affecting the operation of the refrigerator system therein.

6. In combination with a motor driven vehicle, a circulatory refrigerating system within the body thereof operated by said motor, and one or more trailers secured thereto; and means to refrigerate the trailers.

7. In combination with a motor driven vehicle, a circulatory refrigerating system within the body thereof operated by said motor, and one or more trailers secured thereto; and means to refrigerate the trailers, said means being a part of the refrigerating system.

8. In combination with a motor driven vehicle, one or more trailers secured thereto, a circulatory refrigerating system in the body of the vehicle operated by said motor comprising an expansion coil having an extension therefrom in the trailer whereby the trailer is refrigerated at the same time as the vehicle body, said expansion coil and extension being supplied with refrigerant from the same source.

9. In combination with a motor driven vehicle, a circulatory refrigerating system within the body thereof operated by said motor, and one or more trailers secured thereto; means to refrigerate the trailers, said means being a part of the refrigerating system, and means whereby the trailers may be readily disconnected from the vehicle body without interrupting or affecting the operation of the refrigerating system therein.

10. In combination with a motor driven vehicle, a circulatory refrigerating system within the body thereof operated by said motor, and one or more trailers secured thereto; means to refrigerate the trailers, said means being part of the refrigerating system, means whereby the trailers may be readily disconnected from the vehicle body, and means to prevent the loss of refrigerant when the trailers are disconnected, said means acting to operate the system only in the vehicle body.

11. In combination with a motor driven vehicle, one or more trailers detachably secured thereto, a circulatory refrigerating system in the body of the vehicle operated by said motor comprising an expansion coil having an extension therefrom whereby the trailer is refrigerated at the same time as the vehicle body, said expansion coil and extension being supplied with refrigerant from the same source, and means whereby the trailers may be readily disconnected from the vehicle without interrupting the operation of the vehicle system therein.

12. In combination with a motor driven vehicle, one or more trailers detachably secured thereto, a circulatory refrigerating system in the body of the vehicle operated by said motor, and a circulatory liquid refrigerant system for cooling the trailers.

13. In combination with a motor driven vehicle, one or more trailers detachably secured thereto, a circulatory refrigerating system in the body of the vehicle operated by said motor, and cooling coils within the trailer, a liquid refrigerant within the vehicle body, means to cool said refrigerant, and means to circulate the liquid refrigerant through the cooling coils.

14. In combination with a motor driven vehicle, one or more trailers detachably secured thereto, a circulatory refrigerating system in the body of the vehicle operated by said motor, and cooling coils within the trailers; a liquid refrigerant within the vehicle body, means to cool said refrigerant, said means being a part of said first named refrigerating system, and means to circulate the liquid refrigerant through the cooling coils.

15. In combination with a motor driven vehicle, one or more trailers detachably secured thereto, a circulatory refrigerating system in the body of the vehicle operated by said motor, and cooling coils within the vehicle body, means to cool said refrigerant, means to circulate the liquid refrigerant through the cooling coils, cooling coils within the trailers and means whereby the trailers may be readily disconnected from the vehicle without affecting the operation of the refrigerating system therein.

16. In combination with a motor driven vehicle, one or more trailers detachably secured thereto, a circulatory refrigerating system in the body of the vehicle operated by said motor, and cooling coils within the trailer; a liquid refrigerant within the vehicle body, means to cool said refrigerant, said means being a part of said first named refrigerating system, means to circulate the liquid refrigerant through the cooling coils, means whereby the trailers may be readily disconnected from the vehicle without interrupting the operation of the refrigerating system therein, and means to prevent the loss of liquid refrigerant when the trailers are disconnected.

In testimony whereof, I have subscribed my name.

WILFRED FOURNESS.

In testimony whereof, I have subscribed my name.

EDWARD G. BURGHARD.